United States Patent [19]
Alferness et al.

[11] Patent Number: 4,991,975
[45] Date of Patent: Feb. 12, 1991

[54] DIVISION MULTIPLEXING AND DEMULTIPLEXING MEANS LIGHTWAVE COMMUNICATION SYSTEM COMPRISING OPTICAL TIME

[75] Inventors: Rodney C. Alferness, Holmdel; Gadi Eisenstein, Middletown; Steven K. Korotky, Toms River; Rodney S. Tucker, Howell, all of N.J.

[73] Assignee: AT&T Bell Laboratories, Murray Hill, N.J.

[21] Appl. No.: 275,454

[22] Filed: Nov. 22, 1988

[51] Int. Cl.$^5$ .............................................. H04J 14/08
[52] U.S. Cl. ......................................................... 370/4
[58] Field of Search ................ 455/606, 607, 608, 609, 455/613, 612, 617, 618, 619; 370/1, 4

[56] References Cited

U.S. PATENT DOCUMENTS

| | | | |
|---|---|---|---|
| 3,506,834 | 4/1970 | Buchsbaum et al. | 250/199 |
| 3,660,606 | 5/1972 | De Witt | 370/112 |
| 3,909,541 | 9/1978 | Bobilin | 370/112 |
| 4,385,381 | 5/1983 | Alexis | 370/112 |
| 4,427,895 | 1/1984 | Eng | 370/4 |
| 4,759,018 | 7/1988 | Buchner | 370/112 |

OTHER PUBLICATIONS

"Terminals for a High-Speed Optical Pulse Code Modulation Communication System: II. Optical Multiplexing and Demultiplexing", T. S. Kinsel et al, *Proceedings of the IEEE*, vol. 56, No. 2, Feb. 1968, pp. 146-154.
"150 km Optical Fibre Transmission Network Experiment with 2 Gbit/s Throughput", L. C. Blank et al, *Electronics Letters*, vol. 23, No. 19, 9/10/87, pp. 977-978.
"Optical Time-Division Space Switches Using Tree-Structured Directional Coulers", K. Habara et al, *Electronics Letters*, vol. 21, 1987.
"Fully Connectorized High-Speed Ti:LiNbO3 Switch-/Modulator for Time-Division Multiplexing and Data Encoding", S. K. Korotky, *IEEE Journal of Lightwave Technology*, vol. LT-3, No. 1, Feb. 1985.
"16 Gbit/s Fibre Transmission Experiment Using Optical Time-Division Multiplexing", R. S. Tucker et al, *Electronics Letters*, vol. 23, No. 24, 11/19/87, pp. 1270-1271.
"Optical Time-Division Multiplexing for Very High Bit-Rate Transmission", R. S. Tucker et al, *Journal of Lightwave Technology*, vol. 6, No. 11, Nov. 1988, pp. 1737-1749.
"Optical Time-Division Multiplexed Transmission System Experiment at 8 Gbit/s", G. Eisenstein et al, *Electronics Letters*, vol. 23, No. 21, 10/8/87, pp. 1115-1116.
"Optical Time-Division Multiplexing and Demultiplexing in a Multigigabit/Second Fibre Transmission System", R. S. Tucker et al, *Electronics Letters*, vol. 23, No. 5, 2/26/87.

(List continued on next page)

*Primary Examiner*—Joseph A. Orsino
*Assistant Examiner*—L. Van Beek
*Attorney, Agent, or Firm*—Eugen E. Pacher

[57] ABSTRACT

Disclosed is a time division multiplexed optical communication system that is capable of operation at relatively high bit rates and that is relatively stable and immune to crosstalk and noise. The system comprises receiver means wherein the timing signal for demultiplexing is derived from the fully multiplexed optical pulse stream by means that comprise a narrow band receiver and timing means that produce a lower-frequency timing signal from the output of the narrow band receiver. The timing signal is used to drive one or more optical switches. In one embodiment of the invention the receiver means have a binary-tree architecture and the timing signals are substantially sinusoidal. In another embodiment the receiver means have a linear-bus architecture and the timing signals are pulse-like.

7 Claims, 2 Drawing Sheets

OTHER PUBLICATIONS

"Resonant p-i-n-FET Receivers for Lightwave Subcarrier Systems", T. E. Darcie et al, *Journal of Lightwave Technology*, vol. 6, No. 4, Apr. 1988, ppo. 582-589.

"An Integrated 1×4 High-Speed Optical Switch and Its Applications to a Time Demultiplexer", H. Haga et al, *Journal of Lightwave Technology*, vol. LT-3, No. 1, Feb. 1985, pp. 116-120.

"High-Speed $\Delta\beta$-Reversal Directional Coupler Switch", R. C. Alferness et al, *Proceedings of the Topical Meeting on Photonic Switching*, Incline Village, Mar. 1987, pp. 77-79.

"Integrated High-Speed Ti:LiNbO$_3$ $\Delta\beta$-Reversal Switching Circuits", J. J. Veselka et al, *Proceedings of the Topical Meeting on Integrated and Guided Wave Optics*, Sante Fe, Mar. 1988, pp. 357-360.

Bentland et al, "Clock Recovery for a 5 Gbit/s Fibre Optic System", Electronic Letters, 6-24-82, vol. 18, #13, pp. 547-548.

Tell, "Optical Fibre Communication Experiment at 5 Gbit/sec", Applied Optics, 11-15-81, vol. 20, #22, pp. 3853-3858.

DIVISION MULTIPLEXING AND DEMULTIPLEXING MEANS LIGHTWAVE COMMUNICATION SYSTEM COMPRISING OPTICAL TIME

FIELD OF THE INVENTION

This invention pertains to the field of optical communication systems.

BACKGROUND OF THE INVENTION

In recent years optical fiber has become the medium of choice for many long haul signal transmission applications, and transmission rates have steadily increased, with a commercial system capable of operation at about 1.7 Gbit/sec available now. The bandwidth of commercially available single mode optical fiber however is enormous, and even in the currently available or projected highest bit rate systems much fiber bandwidth remains unutilized. For obvious economic reasons, it would be desirable to utilize more of the available bandwidth of optical fiber.

One way of increasing the bit rate of optical fiber systems is to multiplex two or more signal channels onto a single fiber, and systems using wavelength division multiplexing are known. It is also known that some forms of time-division multiplexing can be used in optical communication systems. See, for instance, U.S. Pat. No. 3,506,834, which discloses a time-division multiplexed system that could in principle use optical fiber as the transmission medium. As is well known, in a time-division multiplexed communication system each of n ($n \geq 2$) data streams is allocated a series of time slots on the multiplexed channel, with a multiplexer (MUX) assembling the higher bit-rate stream from the data streams, and a demultiplexer (DEMUX) reconstructing the data streams by separating bits in the multiplexed stream.

Time-division multiplexed optical fiber systems can typically be divided into electrical and optical time-division multiplexed systems. In the former, multiplexing is carried out in the electrical domain, before the electrical/optical (E/O) conversion of the multiplexed signal, and demultiplexing is also carried out in the electrical domain, after the optical/electrical (O/E) conversion of the multiplexed signal. Such a system requires electronics that is capable of processing a very high bit rate stream of electrical pulses, and limitations of the electronics typically limit the possible bit rate of such systems. Electronic "bottlenecks" potentially can occur in the transmitter between and including the MUX and the E/O converter, and in the receiver between and including the O/E converter and the DEMUX, where the electronics must operate at the full multiplexed bit rate.

In optical time-division multiplexed (OTDM) lightwave communications systems these electronic "bottlenecks" are removed by moving the E/O and O/E converters into the baseband channels. Multiplexing is carried out after the E/O conversion and demultiplexing before the O/E conversion. See, for instance, T. S. Kinsel et al., *Proceedings of the IEEE*, Vol. 565(2), Feb. 1968, pp. 146–154. Of course, hybrid systems are also possible. For instance, L. C. Blank et al., *Electronics Letters*, Vol. 23(19), Sept. 1987, pp. 977–978, discloses a system in which multiplexing is carried out after E/O conversion but in which the multiplexed signal is demultiplexed after O/E conversion.

Even though the principle of OTDM has been known for some time, implementation of such systems have been relatively slow, especially for high bit rate systems. One reason for this slow progress may have been the difficulty of providing an appropriate timing signal at the receiver. Another reason may have been the difficulty of providing an optical switch that can separate a very high bit rate pulse stream (typically the multiplexed stream) into two or more pulse streams without causing unacceptably high levels of cross talk. Optical switches are discussed, for instance, in K. Habara et al., *Electronics Letters*, Vol. 21, 1987, pp. 631–632, and in S. K. Korotky et al., *IEEE Journal of Lightwave Technology*, Vol. LT-3(1), 1985, pp. 1–6.

Significant progress has recently been made, resulting inter alia in the demonstration of a 16 Gbit/s OTDM system having four 4 Gbit/s channels. See R. S. Tucker et al., *Electronics Letters*, Vol. 23(24), pp. 1270–71; and R. S. Tucker et al., *Journal of Lightwave Technology*, Vol. 6(11), pp. 1737–1749; both incorporated herein by reference. See also G. Eisenstein et al., *Electronics Letters*, Vol. 23(21), pp. 1115–1116; and R. S. Tucker et al., *Electronics Letters*, Vol. 23(5), pp. 208–209. These papers disclose OTDM systems in which the timing signal for demultiplexing is derived from a fully demultiplexed pulse stream. Specifically, these prior art OTDM systems comprise clock means for producing a substantially sinusoidal electrical signal which is used to drive the switch or switches that are part of the DEMUX portion of the receiver means, with the clock input derived from one of the receivers. The clock input signal thus has a strong component at the (4 GHz) baseband frequency, and it is this component that is utilized for timing recovery.

Although these prior art systems have been successfully operated there still remain some potential problems. For instance, the systems are likely to experience instability, especially during start-up, since the initial phase relationship between the clock input signal and the multiplexed optical pulse stream is generally unknown. Consequently start-up of such a system frequently requires relatively complex adjustments. In addition, noise and crosstalk between baseband channels may cause timing errors which can result in a loss of synchronization.

In view of the obvious economic significance of optical communications systems that can be operated at very high bit rates, it would be highly desirable to have available an OTDM system which can be less subject to instability during start-up and more immune to crosstalk and noise than prior art systems. This application discloses such a system.

In all figures heavy connecting lines signify optical signal transmission and light connecting lines indicate electrical signal transmission.

THE INVENTION

Systems according to the invention comprise transmitter means, receiver means and, typically, optical fiber means signal-transmissively connecting the transmitter and receiver means. Although optical fibers are the currently preferred transmission medium, the invention is not so limited, and other transmission media (including free space) could in principle be employed.

The transmitter means comprise means for generating n (n≧2) optical pulse streams, each of which can carry information, and further comprise multiplexer means for combining the n optical pulse streams into a multiplexed optical pulse stream having a pulse repetition rate $f_p$. The receiver means comprise demultiplexer means adapted for separating the multiplexed optical pulse stream into m (m≧2, m not necessarily equal to n) optical pulse streams, and further comprise a multiplicity of detector means, each adapted for producing an electrical signal in response to an optical pulse stream incident thereon, such that an electrical signal can be produced from each of the multiplicity of demultiplexed optical pulse streams. The electrical signals can be processed in conventional fashion by appropriate utilization means.

The demultiplexer means comprise means for deriving an electrical timing signal of frequency $f'_p < f_p$ (exemplarily $f'_p = 0.5 f_p$) from the multiplexed optical pulse stream. The means comprise coupler means adapted for dividing the multiplexed optical pulse stream into a first and a second optical pulse stream, timing receiver means adapted for producing a substantially sinusoidal electrical signal of frequency $f_p$ from the second optical pulse stream, and means for producing the timing signal from the output of the timing receiver means, the latter means typically comprising a phase-locked loop followed by a frequency divider. The demultiplexer means typically also comprise means for adjusting the phase of the timing signal relative to the (multiplexed) first optical pulse stream, or relative to a multiplexed optical pulse stream derived from the first pulse stream. The timing receiver means advantageously comprise a narrow-band receiver with resonator means. By deriving the timing signal from the fully multiplexed optical pulse stream the stability of the system during start-up can be improved, as can be the immunity to crosstalk and noise.

Figure 3:
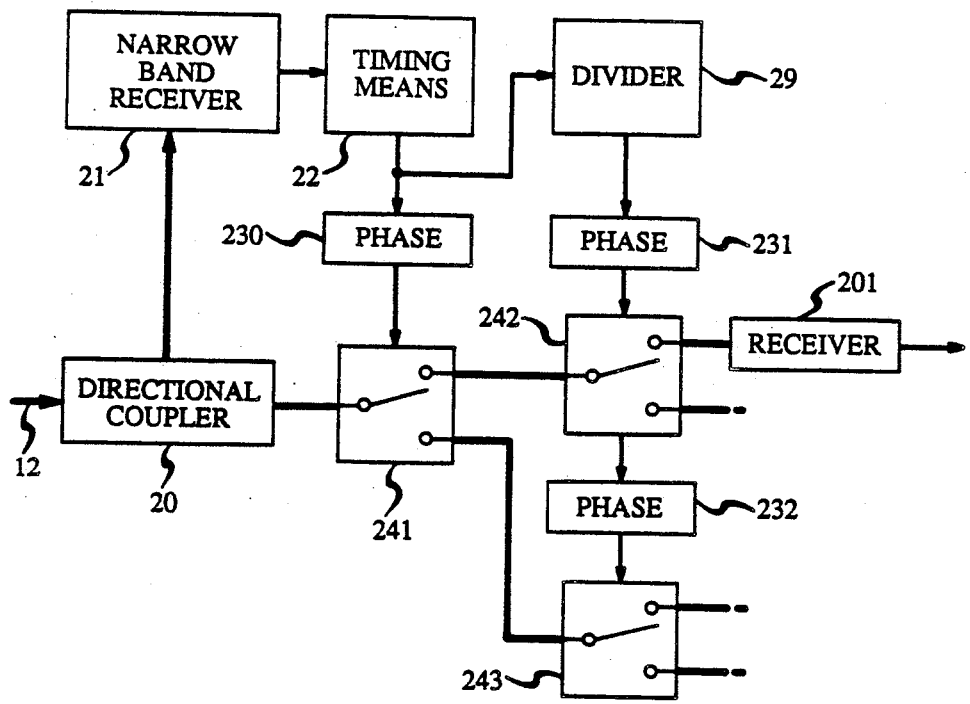
FIG. 3 shows schematically the receiver means of a binary-tree-type inventive system.
Figure 4:
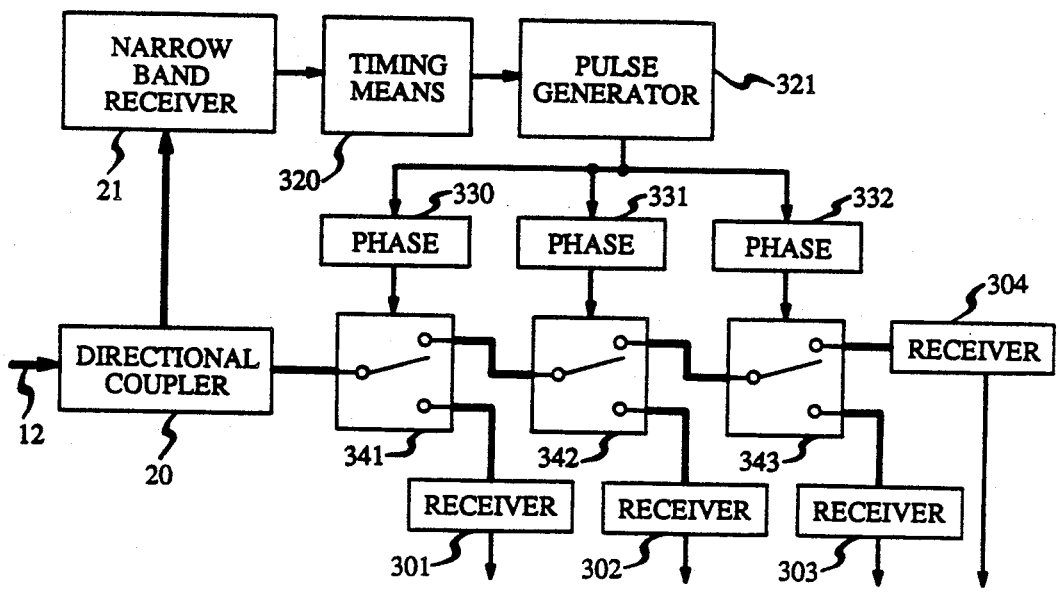
FIG. 4 depicts schematically the receiver means of a linear bus-type inventive system.

The demultiplexer means further comprise at least first optical switch means responsive to the electrical timing signal and comprising at least one input port and at least two output ports, with the first optical pulse stream caused to enter the input port and an optical pulse stream of repetition rate $f'_p$ appearing at least at one of the output ports. Frequently each of the at least two output pulse streams has repetition rate $f'_p$, where $f'_p$ can either be the fully demultiplexed repetition rate or an intermediate repetition rate. In the latter case the first level of demultiplexing typically is followed by one or more further demultiplexing levels, as is the case in an architecture frequently referred to as a binary tree structure. An example of a binary tree-type structure is shown in FIG. 3. On the other hand, in a so-called linear bus architecture one output of the first switch typically is fully demultiplexed whereas the other has an intermediate repetition rate, with the latter providing the input to a further optical switch means which again typically has one fully demultiplexed output and one partially demultiplexed output, the latter possibly forming the input to still another optical switch means, etc. An example of a linear bus structure is shown in FIG. 4. A binary tree structure and a linear bus structure are schematically depicted in FIG. 8 of a previously referred to paper by R. S. Tucker et al. (J.L.T. Vol. 6(11)).

A variety of transmitter means can be used in systems according to the invention, and all such transmitter means are contemplated. The previously referred to pulse stream generating means of the transmitter typically comprise one or more lasers. The lasers need not be co-located, and typically are chosen so as to all have essentially the same emission wavelength, typically a wavelength in the infrared, e.g., about 1.3 μm or about 1.55 μm. Of course it is also possible to use wavelength-division multiplexing in addition to OTDM, e.g., by using OTDM for radiation in two or more relatively narrow wavelength regimes, e.g., at or near 1.3 or 1.5 μm, and by combining and separating the different wavelength pulse streams in a known way.

The pulse stream generating means are intended to be of a type that can produce a pulse stream that carries information in accordance with an external signal (e.g., using pulse code modulation). Exemplarily a laser can be caused to emit the information-carrying pulse stream in a known manner, or the laser is caused to emit a uniform stream of pulses and the stream is modified in known manner, e.g., by substantially removing one or more pulses from the stream by means of a Ti:LiNbO$_3$ switch/modulator. Such pulse streams (uniform or appropriately modified) are frequently referred to as "baseband" pulse streams.

MUX means may be active or passive, in the latter case comprising a device or devices such as a fiber directional coupler, and in the former case comprising a device or devices such as optical switches. Both types of devices are known to those skilled in the art.

It will be apparent that an appropriate temporal relationship has to exist between the n baseband pulse streams, such that each pulse in the multiplexed pulse stream is within its assigned time slot, with little or no overlap between neighboring pulses (of nominally the same wavelength). This can be achieved, for instance, by means of a transmitter clock signal in conjunction with appropriate delay elements. The nominal pulse repetition rate of the multiplexed pulse stream is $f_p$, and the nominal pulse width is $\tau_p$, with $\tau_p$ being $\leq 1/f_p$, preferably being substantially less than $1/f_p$.

Subsequent to multiplexing the pulse stream typically is coupled into an optical fiber wherein it propagates to the receiver means. Optical amplification of the pulse stream is contemplated, possibly after multiplexing and before coupling into the fiber, and/or at a point or points between transmitter and receiver. Optical amplifiers are known to those skilled in the art. The optical fiber typically is a single mode fiber, possibly dispersion shifted such that the minimum dispersion wavelength coincides approximately with the minimum loss wavelength.

The receiver means comprise DEMUX means that are adapted for separating the multiplexed pulse stream into m demultiplexed optical pulse streams, and detector means for producing an electrical signal in response to an optical signal, e.g., a demultiplexed pulse stream that is caused to be incident on the active area of the detector means. Typically each of the demultiplexed pulse streams essentially corresponds to (i.e., carries essentially the same information as) a predetermined pulse stream prior to multiplexing. Detector means that can be used in the practice of the invention are known to those skilled in the art and do not require detailed discussion.

The DEMUX means comprise means for deriving an electrical timing signal from the multiplexed optical pulse stream. Derivation of the timing signal from the multiplexed pulse stream at the receiver end of the systems is considered to be a significant aspect of the invention and can result in increased stability of the system, compared to at least some prior art systems. Furthermore, use of a sinusoidal timing signal in at least some embodiments of the invention is considered to be a significant aspect of the invention that makes it possible to employ relatively narrowband electronics which typically can operate at higher frequencies than the digital (i.e., relatively broadband) electronics required to process pulse signals.

Figure 1:
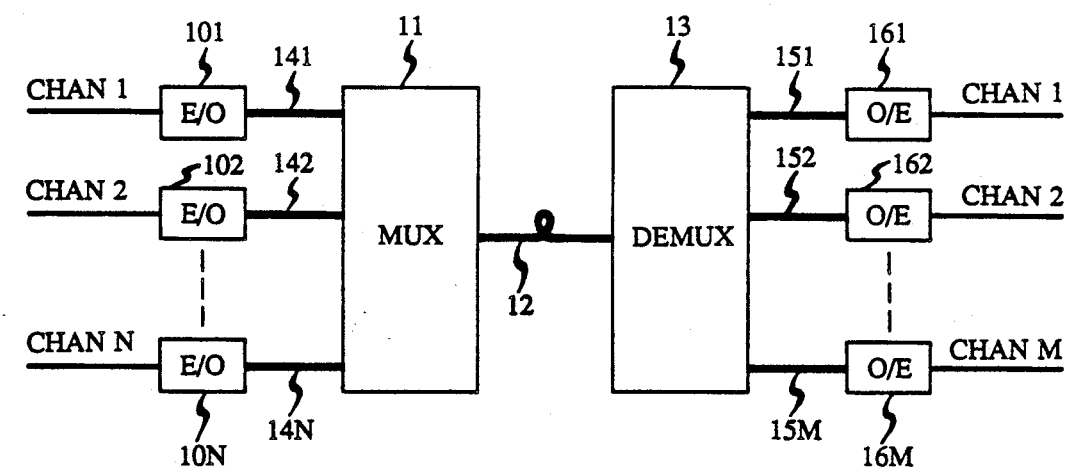
FIG. 1 schematically depicts a general OTDM system.

FIG. 1 schematically depicts a generalized OTDM lightwave communication system. The system is shown to comprise n baseband channels, each such channel exemplarily having bandwidth B. While equal bandwidth is convenient it is not a requirement. In any given channel the information-carrying electrical signal is transformed in E/O converting means (101, 102, . . . 10n) into a stream of optical pulses that is transmitted on appropriate means (141, 142, . . . 14n, e.g., fiber, planar guides, etc.) to MUX 11, which assembles the n optical pulse streams into a multiplexed optical pulse stream of repetition rate $f_p$. The multiplexed pulse stream is coupled into an appropriate transmission medium, e.g., optical fiber 12, propagates therethrough to the receiver and is coupled into the DEMUX 13. The multiplexed pulse stream is separated into m (m not necessarily equal to n) optical pulse streams that are carried through appropriate means (151, 152, . . . 15m) to respective O/E converting means (161, 162, . . . 16m). The resulting electrical information-bearing signals are then available for further processing, including decoding into machine- or human-readable form, using appropriate apparatus (not shown) to be referred to generically as utilization means. It will be appreciated that, optionally, the optical pulse streams can be amplified at one or more points in the system. Amplification means are known and are not shown. Various architectures are possible for the transmitter means, and all are considered to be within the scope of the invention. Two exemplary architectures are schematically depicted in FIG. 4 of R. S. Tucker et al., *IEEE Journal of Lightwave Technology*, Vol. LT 6(11), pp. 1737–1749, October 1988. See also R. S. Tucker et al., *Electronics Letters*, Vol. 23(24), pp. 1270–1271, Nov. 19, 1987.

Figure 2:
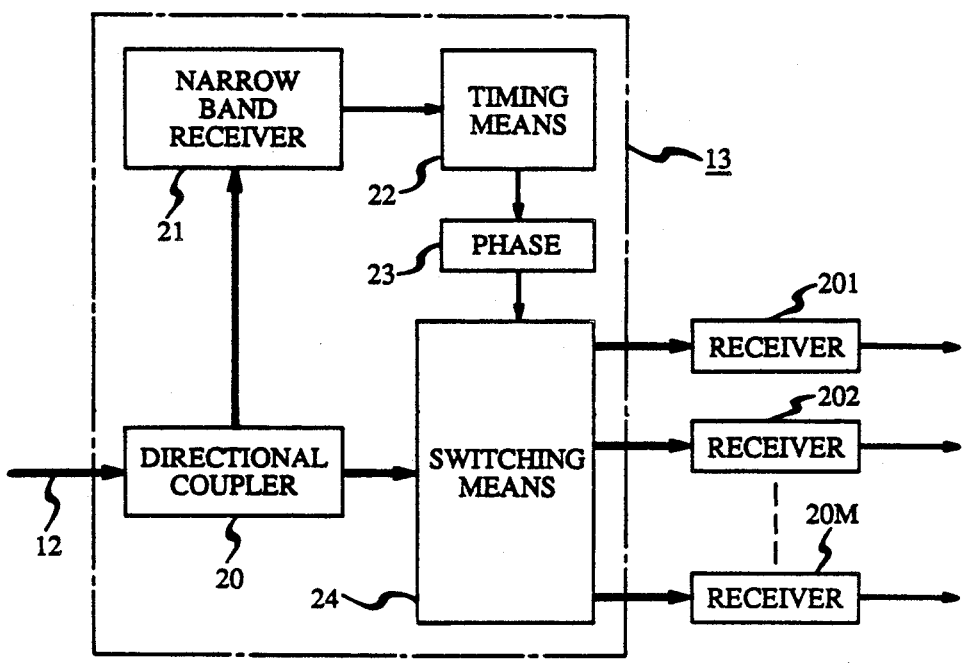
FIG. 2 schematically depicts the receiver means of a OTDM system according to the invention.

FIG. 2 schematically depicts exemplary receiver means according to the invention. DEMUX means 13 comprise directional coupler 20 used to provide an optical pulse stream (multiplexed, therefore nominal pulse repetition rate $f_p$) to narrowband optical receiver 21. The coupling ratio of the directional coupler advantageously is selected such that most of the optical power on the input line 12 is directed to the switching means 24 and only a small portion of the optical power is coupled to the narrow-band receiver 21. The receiver 21 advantageously comprises resonant tuning means (such optical receivers are known; see, for instance, T. E. Darcie et al., *Journal of Lightwave Technology*, Vol. 6(4), pp. 582–589), whereby high sensitivity can be achieved. The narrow-band optical receiver 21 provides a substantially sinusoidal electrical signal (of frequency $f_p$) to timing means 22 (which exemplarily comprise a microwave phase-locked loop followed by a frequency divider) which produces a sinusoidal signal of frequency $<f_p$, exemplarily 0.5 $f_p$. Phase-locked loops and frequency dividers are known in the art. After appropriate phase adjustment in phase shift means 23 (exemplarily a microwave delay line) and possible amplification the timing signal is provided to switching means 24 where it can directly drive the first level switch. If higher level switches are present ($n \geq 4$) then further frequency division can be used to obtain the necessary driving signals. However, in some applications it may be feasible to use a configuration in which all switches are driven at the same frequency.

FIG. 3 schematically shows the receiver means of a 4-channel exemplary system (binary tree-type) according to the invention. The pulse repetition rate of the multiplexed pulse stream exemplarily is 16 Gbit/s. This pulse stream is divided by directional coupler 20 into a first and a second pulse stream, with the first pulse stream (containing most, e.g., 99%, of the optical power) coupled into first level switch 241. The switch, exemplarily a 5 mm long high speed fiber pigtailed Ti:LiNbO$_3$ traveling wave $\Delta\beta$-reversal directional coupler switch (see, for instance, R. C. Alferness et al., paper ThD6, *Proceedings of the Topical Meeting on Photonic Switching*, Incline Village, March 1987), is driven by an 8 GHz sinusoidal timing signal whose phase relative to the multiplexed pulse stream is adjusted by means of microwave delay line 230 such that the pulses of two predetermined basebands (e.g., channels 1 and 3) appear at one output port of the switch, and the pulses of the other two basebands (e.g., channels 2 and 4) appear at the other output port of the switch. The 8 GHz timing signal is produced by means of narrowband optical receiver 21 and timing means 22. The former has a substantially sinusoidal (typically less than about 10% harmonic content) 16 GHz output, and the latter produces a 8 GHz substantially sinusoidal signal from the output of 21. The outputs of 241 are connected to the input port of second level switches 242 and 243, respectively. These switches can be similar to 241 (exemplarily, 10 mm long Ti:LiNbO$_3$ traveling wave $\Delta\beta$ reversal directional coupler switches), and each is driven by a 4 GHz substantially sinusoidal timing signal, each signal appropriately phase shifted by a delay line (231 and 232). The 4 GHz signal is produced from the output of 22 by divider 29. Microwave delay lines, frequency dividers, and phase-locked loops are known to those skilled in the art. The pulse stream appearing at a given output port of the second-level switches corresponds to the pulse stream of a predetermined baseband channel and is transformed into an electrical signal by appropriate receiver means, only one of which (201) is shown.

In FIG. 3 the 1×4 DEMUX is shown built up from 1×2 switches. This is exemplary only, and in many applications it may be advantageous to use 1×n integrated switching means. Such devices are known to those skilled in the art. See, for instance, J. J. Veselka et al., paper WD2, *Proceedings of the Topical Meeting on Integrated and Guided Wave Optics*, Santa Fe, March 1988 and H. Haga et al., *Journal of Lightwave Technology*, Vol. LT-3(1), pp. 116–120. Furthermore, either velocity-matched switches or resonator-type switches can be used in the practice of the invention.

FIG. 4 schematically depicts the receiver means of another exemplary system (linear bus-type) according to the invention. From the incoming optical pulse stream (exemplarily 16 Gbit/s) is again produced a 16

GHz substantially sinusoidal electrical signal from which is produced a 4 GHz pulse-like signal by timing means 320 and pulse generator 321. The output of 321 is appropriately phase shifted by means of delay lines 330, 331, and 332, and applied to switches 341, 342, and 343, respectively. Each switch (which can be of one of the previously discussed types) has two outputs, one of which typically is fully demultiplexed (4 Gbit/s) and is connected to receivers 301, 302, and 303, respectively. Switches 341 and 342 also have a partially demultiplexed output (12 and 8 Gbit/s, respectively), which forms the input to the next switch. The last switch in the chain (343) has of course two fully demultiplexed outputs.

Binary tree-like architectures are advantageously used if all baseband receivers are substantially co-located as, for instance, in a point-to-point trunk system. On the other hand, linear bus-type architectures permit placement of baseband receiver means at widely separate locations as, for instance, in a local loop. In principle the bit rates could be different in different basebands. However, there are disadvantages associated with linear bus architectures, and consequently this architecture is currently not preferred for high bit rate OTDM communication systems. As will be appreciated by those skilled in the art, hybrid systems that combine tree-type and bus-type architecture are also possible.

EXAMPLE:

In an OTDM system of the type schematically depicted in FIGS. 2 and 3, with n=4 and a baseband bit of 4 Gbit/s, 4 actively mode-locked semiconductor lasers are used. The lasers are of a known type and are antireflection coated. The lasers are used in conjunction with 5 cm long fiber extended cavities having microwave resonance frequencies of 2 GHz. The lasers are mode-locked at the second harmonic of the resonance frequency. The four lasers are operated simultaneously from a common 4 GHz clock, a commercially available frequency synthesizer, with three microwave delay lines used to timeshift three of the pulse streams relative to the fourth. The (1.3 μm) pulses have FWHM of about 15 ps, and baseline width (D) of about 30 ps. The width thus is substantially less than $1/f_p$ (~62 ps). At the cost of increased cross talk the pulse width could be increased, up to about $D=1/f_p$. The overall spectral width of the output of each laser is about 5 nm. High speed Ti:LiNbO$_3$ waveguide electro-optic directional couplers, with uniform $\Delta\beta$ travelling-wave electrodes, are used as modulators. Such devices are well known in the art. The four 4 Gbit/s (return-to-zero) optical pulse streams are multiplexed into a 16 Gbit/s (RTZ) optical pulse stream by means of a binary tree arrangement of passive 3-dB fiber directional couplers, and the multiplexed pulse stream coupled into 8 km of standard single mode optical fiber. After transmission through the fiber the multiplexed pulse stream is coupled into a directional coupler (a commercially available 10db passive coupler) and the high power output of the coupler is fed into a 2-level binary tree demultiplexer. The first switch is a 5 mm long high speed fiber-pigtailed Ti:LiNbO$_3$ traveling-wave $\Delta\beta$-reversal directional coupler switch and is driven by a sinusoidal control voltage of 8 GHz. The two outputs of this switch are further demultiplexed in two further fiber-pigtailed Ti:LiNbO$_3$ switches, each 10 mm long and driven by a sinusoidal of 4 GHz signals. The 8 GHz signal is derived from the low power output of the directional coupler by means of a resonant p-i-n FET receiver followed by a phase-locked loop and a 2:1 frequency divider. A microwave delay line is used to appropriately adjust the phase of the 8 GHz signal relative to the optical pulse stream entering the first switch. Such delay lines are well known. A 4 GHz signal is obtained from the 8 GHz signal by means of a frequency divider and its phase adjusted relative to the partially demultiplexed pulse streams by means of microwave delay lines. The baseband optical pulse streams are converted into electrical signals by means of receivers, each comprising an avalanche photodiode coupled to a low noise GaAs FET. Such receivers are known in the art. Other parts of the system, such as couplers, connectors, and microwave amplifiers, are conventional and do not require discussion. The system exhibits relatively good stability at start-up, and is relatively immune to crosstalk and noise.

We claim:

1. A time-division multiplexed communication system comprising transmitter means, receiver means, and optical fiber means signal-transmissively connecting the transmitter and receiver means;
    wherein the transmitter means comprise
    (a) means for generating n optical pulse streams, with $n \geq 2$, a given pulse stream to carry information in accordance with an external signal; and
    (b) multiplexer means for combining the n optical pulse streams into a multiplexed optical pulse stream nominally having a pulse repetition rate $f_p$;
    wherein the receiver means comprise
    (c) demultiplexer means adapted for separating the multiplexed optical pulse stream into m ($m \geq 2$, with m not necessarily equal to n) optical pulse streams; and
    (d) a multiplicity of detector means, each detector means adapted for producing an electrical signal in response to an optical pulse stream incident thereon, the detector means arranged such that an electrical signal can be produced from each of the multiplicity of demultiplexed optical pulse streams;
    CHARACTERIZED IN THAT the demultiplexer means comprise
    (e) means for deriving an electrical timing signal of frequency $f'_p$ from the multiplexed optical pulse stream, with $f'_p$ being less than $f_p$, said deriving means comprising coupler means adapted for dividing the multiplexed optical pulse stream into a first and a second optical pulse stream, further comprising means for producing a substantially sinusoidal electrical signal of frequency $f_p$ from the second optical pulse stream; means for producing the timing signal from the electrical signal of frequency $f_p$, and still further comprising means for adjusting the phase of the timing signal relative to the multiplexed optical pulse stream; and
    (f) at least a first optical switch means that is responsive to the electrical timing signal of frequency $f'_p$ and comprises at least one input port and at least two output ports, the first optical pulse stream entering the input port and an optical pulse stream of repetition rate $f'_p$ appearing at an output port.

2. System according to claim 1, wherein $f_p$ and the nominal width $\tau_p$ of the optical pulses are chosen such that $\tau_p$ is substantially less than $1/f_p$, and wherein n=m.

3. System according to claim 1, wherein $n \geq 4$, wherein the demultiplexer means comprise a multiplicity of optical switches arranged in a binary tree structure having at least two levels, and wherein the timing signal is substantially sinusoidal.

4. System according to claim 1, wherein n>2, and wherein the demultiplexer means comprise a multiplicity of optical switches arranged in a linear bus structure.

5. System according to claim 1, wherein n is not a multiple of 2.

6. System according to claim 1, wherein the n optical pulse streams do not all have the same repetition rate.

7. System according to claim 1, wherein the means for producing the electrical signal of frequency $f_p$ comprise a resonant narrow-band optical receiver, and wherein the means for producing the timing signal comprise a phase-locked loop and a frequency divider.

* * * * *